(12) United States Patent
Kaizu et al.

(10) Patent No.: US 7,307,808 B2
(45) Date of Patent: *Dec. 11, 2007

(54) MAGNETIC RECORDING AND REPRODUCING APPARATUS AND CONTROL METHOD THEREOF, MAGNETIC RECORDING MEDIUM, AND STAMPER FOR MANUFACTURING OF MAGNETIC RECORDING MEDIUM

(75) Inventors: Akimasa Kaizu, Tokyo (JP); Yoshikazu Soeno, Tokyo (JP); Makoto Moriya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/257,033

(22) Filed: Oct. 25, 2005

(65) Prior Publication Data

US 2006/0209454 A1    Sep. 21, 2006

(30) Foreign Application Priority Data

Mar. 16, 2005   (JP)   ............................. 2005-074385

(51) Int. Cl.
*G11B 21/02* (2006.01)
(52) U.S. Cl. ............................. 360/75; 360/48; 360/39
(58) Field of Classification Search ...................... None
See application file for complete search history.

(56) References Cited

U.S. PATENT DOCUMENTS

| | | | | |
|---|---|---|---|---|
| 5,537,282 | A * | 7/1996 | Treves et al. | 360/135 |
| 5,590,009 | A * | 12/1996 | Ishida | 360/135 |
| 6,262,860 | B1 * | 7/2001 | Ishida | 360/78.05 |
| 6,510,015 | B2 * | 1/2003 | Sacks et al. | 360/75 |
| 6,816,330 | B2 * | 11/2004 | Ikeda et al. | 360/59 |

FOREIGN PATENT DOCUMENTS

| | | |
|---|---|---|
| JP | A 7-73618 | 3/1995 |
| JP | A 7-78432 | 3/1995 |

\* cited by examiner

*Primary Examiner*—K. Wong
(74) *Attorney, Agent, or Firm*—Oliff & Berridge, PLC

(57) ABSTRACT

A magnetic recording and reproducing apparatus has a magnetic recording medium onto which servo information including position information is recorded by a concavo-convex pattern formed by a magnetic layer and a signal processing circuit that generates position control signal of a magnetic head based on amplitude values of fundamental wave component and at least one harmonic component in a reproduced signal of the position information. This magnetic recording and reproducing apparatus can increase the output of the position control signal and also increase the accuracy of the positioning control of the magnetic head.

15 Claims, 11 Drawing Sheets

Concavo-convex pattern

MAGNETIC RECORDING AND REPRODUCING APPARATUS AND CONTROL METHOD THEREOF, MAGNETIC RECORDING MEDIUM, AND STAMPER FOR MANUFACTURING OF MAGNETIC RECORDING MEDIUM

BACKGROUND OF THE INVENTION

1. Field of the Invention

The present invention relates to a magnetic recording and reproducing apparatus including a magnetic recording medium such as a discrete track medium or patterned medium and a control method thereof, a magnetic recording medium, and a stamper for manufacturing of a magnetic recording medium.

2. Description of the Related Art

A magnetic recording and reproducing apparatus including a magnetic recording medium on which positioning information used for positioning control for a magnetic head is recorded has been conventionally known.

Figure 17:
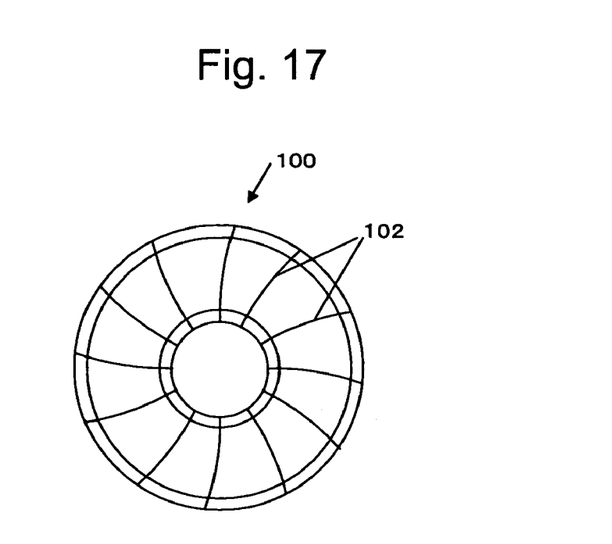
FIG. 17 is a plan view schematically showing a magnetic recording medium of a conventional magnetic recording and reproducing apparatus.

FIG. 17 shows an exemplary magnetic recording medium included in the conventionally known magnetic recording and reproducing apparatus.

The magnetic recording medium 100 shown in FIG. 17 has a plurality of servo region 102 radially formed at predetermined intervals. A concavo-convex pattern formed by a magnetic layer forms each servo region 102.

Figure 18:
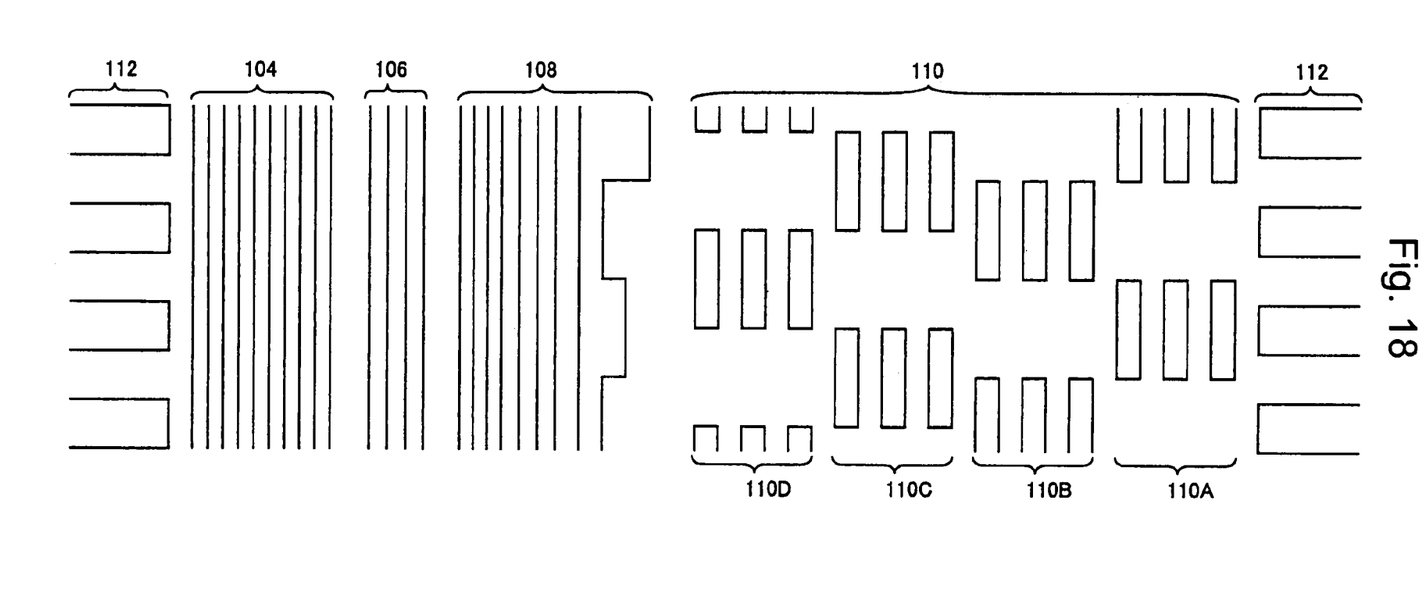
FIG. 18 is an enlarged view schematically showing a portion around a servo region on the magnetic recording medium of the conventional magnetic recording and reproducing apparatus.

Servo information is stored in the servo region 102. As shown in FIG. 18 that shows the servo region 102 in an enlarged state, the servo information includes a preamble portion 104, a servo mark portion 106, an address portion 108 in which address information is stored, and a burst portion 110 in which position information is stored. User data is to be recorded on data tracks 112 as shown in the same figure.

A burst pattern formed by four types of burst signal groups 110A, 110B, 110C, and 110D is formed as the position information in the burst portion 110 of the servo region 102. The burst signal groups 110A and 110B are arranged as a pair of position information in such a manner that they each symmetrically extend with respect to the center line of the corresponding data track 112. The burst signal groups 110C and 110D are arranged as another pair of position information at positions shifted from the burst signal groups 110A and 110B by a half of a track pitch, respectively.

Figure 19:
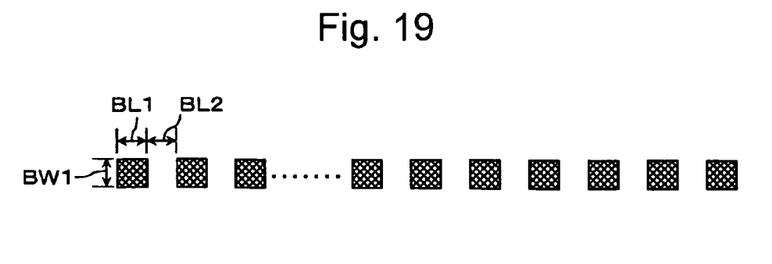
FIG. 19 is an enlarged view schematically showing a burst signal group in the servo region on the magnetic recording medium of the conventional magnetic recording and reproducing apparatus.

FIG. 19 is an enlarged view of the burst signal group 110A. The other burst signal groups 110B, 110C, and 110D also have the same structure as that of the burst signal group 110A.

As shown in FIG. 19, the burst signal group 110A (110B, 110C, or 110D) is formed by a plurality of (about 10 to 30 in a typical case) concavo-convex patterns arranged in a circumferential direction. In the concavo-convex pattern, convex portions (mesh portions in FIG. 19) formed by a magnetic layer (magnetic material) have a length BL1 in the circumferential direction and a radial width BW1 in a radial direction, and concave portion have a length BL2 in the circumferential direction. In general, the magnetic recording and reproducing apparatus rotates the magnetic recording medium 100 at a constant angular velocity. Thus, the circumferential length BL1 of the convex portion and the circumferential length BL2 of the concave portion are varied depending on their positions in the radial direction on the magnetic recording medium 100, and they become longer from an inner circumferential side to an outer circumferential side of the magnetic recording medium 100.

Figure 20:
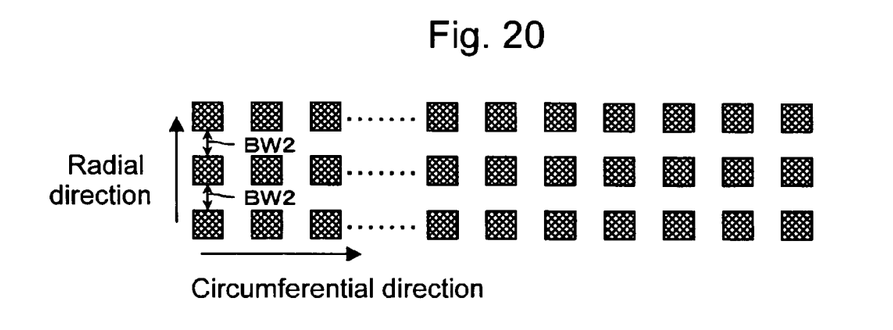
FIG. 20 is an enlarged view schematically showing a part of a burst pattern in the servo region on the magnetic recording medium of the conventional magnetic recording and reproducing apparatus.

The burst pattern in the burst portion 110 is formed by arranging each burst signal group (110A, 110B, 110C, or 110D) at a plurality of positions at an interval BW2 in the radial direction, as shown in FIG. 20.

Figure 21:
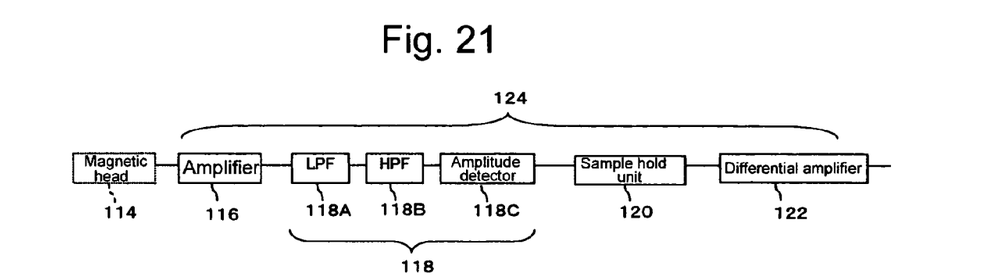
FIG. 21 is a block diagram of a position control circuit of the conventional magnetic recording and reproducing apparatus.

A position control circuit 124 reproduces the above burst pattern. An exemplary position control circuit 124 is shown in FIG. 21. This position control circuit 124 is composed of an amplifier 116 that amplifies reproduced signal read by a magnetic head 114, a signal processing circuit 118 (that comprises an LPF (Low Pass Filter) 118A, an HPF (High Pass Filter) 118B, and an amplitude detector 118C), a sample hold unit 120 that holds position control signal after signal processing, and a differential amplification circuit 122.

After the burst pattern recorded on the magnetic recording medium 100 is read by the magnetic head 114, the reproduced signal of the burst pattern is amplified by the amplifier 116 and is then input to the signal processing circuit 118. The reproduced signal input into the signal processing circuit 118 is output to the sample hold unit 120 as position control signal after only the fundamental wave component of the reproduced signal is extracted. The sample hold unit 120 holds the position control signals of the burst signal groups 110A, 110B, 110C, and 110D. The differential amplifier 122 obtains an output difference between the position control signals of the burst signal groups 110A and 110B or between the position control signals of the burst signal groups 110C and 110D, thereby acquiring position information of the magnetic head 114. In this manner, positioning (tracking) control for the magnetic head 114 is carried out (refer to Japanese Patent Laid-Open Publication No. Hei 7-78432 for example).

Figure 22:
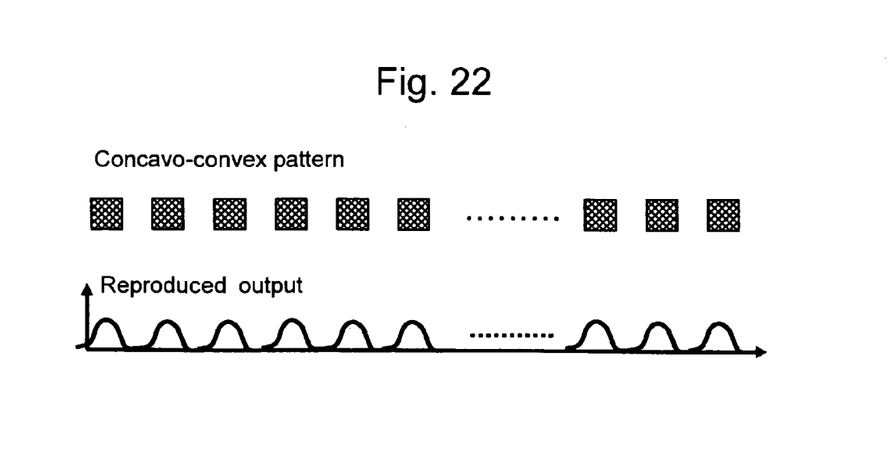
FIG. 22 is a view showing a relationship between a concavo-convex pattern on the magnetic recoding medium and a reproduced signal of the concavo-convex pattern in the conventional magnetic recording and reproducing apparatus.

However, in case of a magnetic recording medium such as a discrete track medium and a patterned medium, on which the burst pattern (position information) is recorded by the concavo-convex pattern formed by the magnetic layer, a magnetization signal of the concavo-convex pattern is recorded with unidirectional polarity. Thus, the reproduced signal of the concavo-convex pattern has a waveform shown in FIG. 22. In FIG. 22, mesh portions represent a plan view of the convex portions in the concavo-convex pattern. Please note that the reproduced signal waveform of the concavo-convex pattern in FIG. 22 is an example in the case where the magnetic layer is a perpendicular magnetic recording layer.

In that magnetic recording medium in which the burst pattern is recorded by the concavo-convex pattern formed by the magnetic layer, the output level of the position control signal used for positioning control for the magnetic head is about half, as compared with a conventional continuous-layer medium in which a magnetization signal of a concavo-convex pattern is recorded with bidirectional polarity. Thus, improvement of the position control for the magnetic head has a limitation.

SUMMARY OF THE INVENTION

In view of the foregoing problems, various exemplary embodiments of this invention provide a magnetic recording and reproducing apparatus and a control method thereof that can make an output of a position control signal larger and can perform positioning control for a magnetic head with high precision as well as a magnetic recording medium used therefor and a stamper for manufacturing of a magnetic recording medium used to manufacture this magnetic recording medium.

The inventors of the present invention focused on the fact that reproduced signal of position information was comparatively close to sine waves on a conventional continuous-layer recording medium with reduced harmonic components included therein, and that in contrast reproduced signal waveforms of discrete track media and patterned media which only have magnetization signal with a single-direction polarity are different from sine waves as well as ever increasing harmonic components included in the reproduced signal. As a result, the inventors of the present invention discovered that position control signal can be increased by adding harmonic component to fundamental wave component of reproduced signal of position information.

Accordingly, various exemplary embodiments of the present invention provide a magnetic recording and reproducing apparatus comprising: a magnetic recording medium onto which servo information including position information is recorded by a concavo-convex pattern formed by a magnetic layer,; and signal processing device that generates a position control signal of a magnetic head based on amplitude values of fundamental wave component and at least one harmonic component in a reproduced signal of the position information.

More over various exemplary embodiments of the present invention provide a control method of a magnetic recording and reproducing apparatus comprising performing position control of a magnetic head based on amplitude values of fundamental wave component and at least one harmonic component in a reproduced signal of position information recorded on a magnetic recording medium by a concavo-convex pattern formed by a magnetic layer.

Furthermore, various exemplary embodiments of the present invention provide a magnetic recording medium on which position information is recorded, the position information comprising burst signal groups wherein a plurality of the concavo-convex patterns are arranged in a circumferential direction, and wherein a concavo-convex ratio A/B between a length A in the circumferential direction of a concave portion and a length B in the circumferential direction of the convex portion on the identical burst signal groups is within a range of larger than 0.19 and smaller than 1.

Various exemplary embodiments of the present invention provide a stamper for manufacturing of a magnetic recording medium wherein a concavo-convex pattern is formed to have a convex portion that corresponds to the concave portion of the concavo-convex pattern on the magnetic recording medium and a concave portion that corresponds to the convex portion of the concavo-convex pattern on the magnetic recording medium.

The term "position information" in this application shall refer to information used for positioning (tracking) control for a magnetic head. A burst pattern recorded on a burst portion of a servo region corresponds to the "position information."

The term "reproduced signal of position information" in the present invention shall refer to a signal output when a magnetization signal of the concavo-convex pattern is reproduced by means of the magnetic head, as well as a signal obtained by amplifying that signal.

The magnetic recording and reproducing apparatus and the control method thereof according to the present invention have an excellent effects that the output of the position control signal can be made larger and the positioning control for the magnetic head can be performed with high precision.

The magnetic recording medium according to the present invention has an excellent effect of making it possible to provide a magnetic recording and reproducing apparatus that the output of the position control signal can be made larger and the positioning control for the magnetic head can be performed with high precision.

The stamper for manufacturing of a magnetic recording medium according to the present invention has an excellent effect of making it possible to manufacture a magnetic recording medium used in a magnetic recording and reproducing apparatus that the output of the position control signal can be made larger and the positioning control for the magnetic head can be performed with high precision.

DETAILED DESCRIPTION OF THE PREFERRED EMBODIMENTS

In the following, a magnetic recording and reproducing apparatus and a control method thereof according to first to third exemplary embodiments of the present invention will be described with reference to the drawings.

Figure 1:
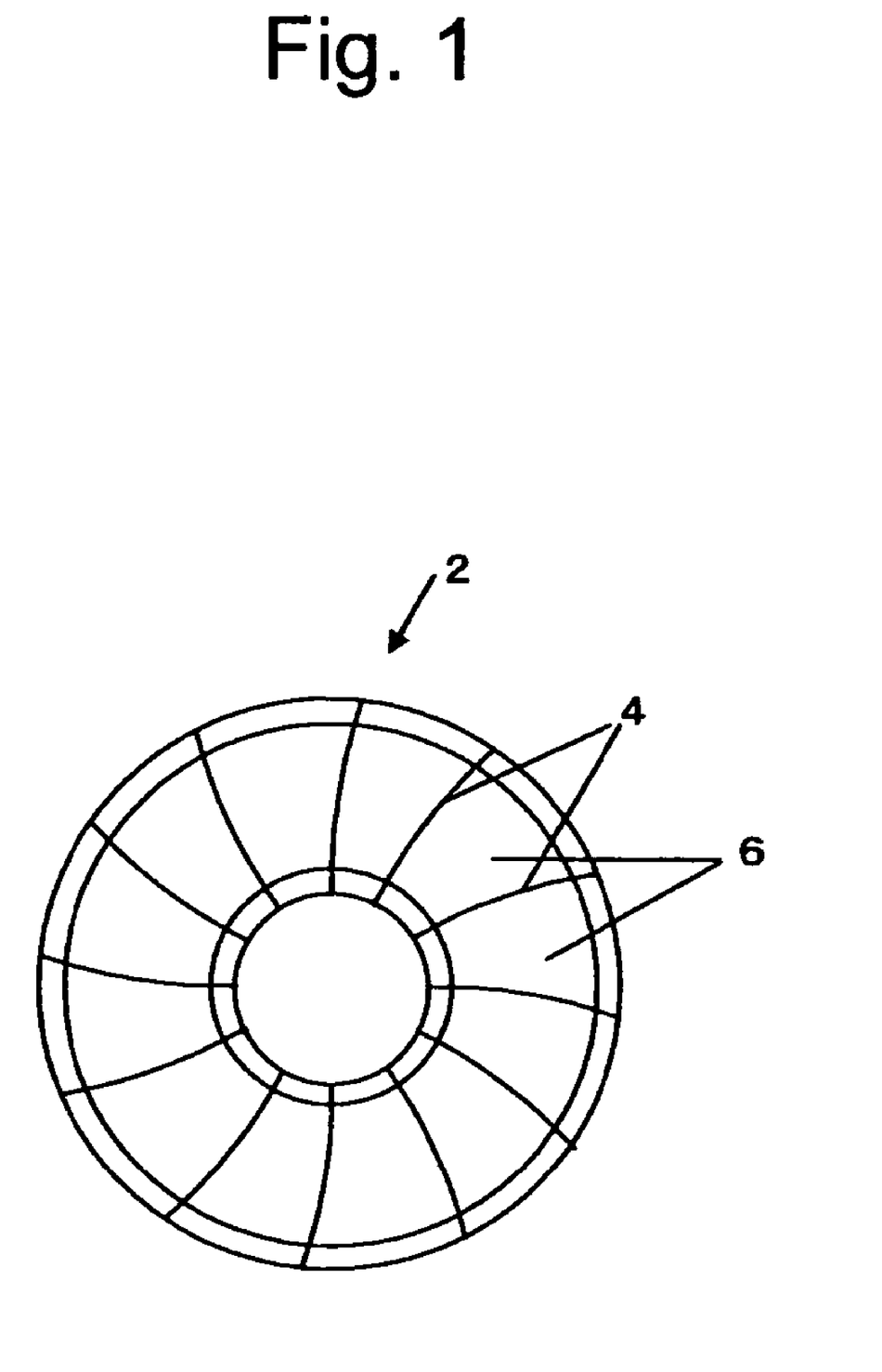
FIG. 1 is a plan view schematically showing a magnetic recording medium in a magnetic recording and reproducing apparatus according to a first exemplary embodiment of the present invention.

The magnetic recording and reproducing apparatus (not shown) of the first exemplary embodiment includes a magnetic recording medium 2 having a disk-like shape, as shown in FIG. 1. A plurality of servo region 4 and a plurality of user data region 6 are alternately arranged in a circumferential direction on the magnetic recording medium 2.

Figure 2:
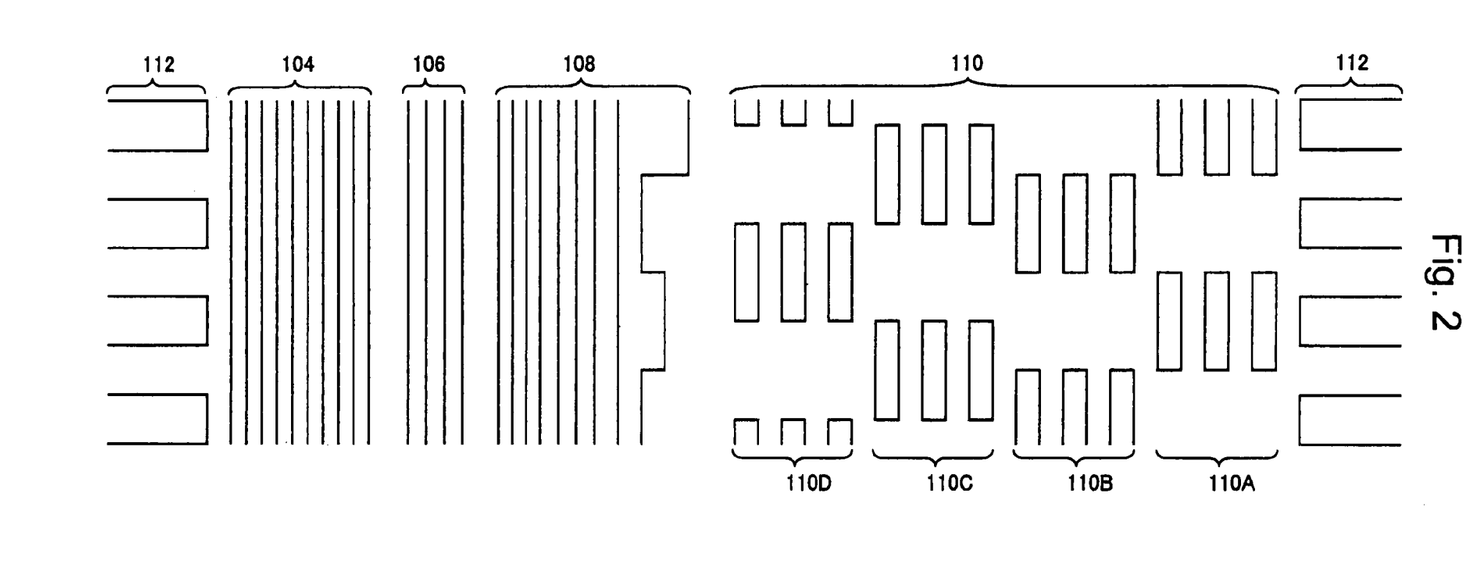
FIG. 2 is an enlarged view schematically showing a portion around a servo region on the magnetic recording medium of the magnetic recording and reproducing apparatus.

Servo information is stored in the servo region 4. As shown in FIG. 2, the servo information includes a preamble portion 104, a servo mark portion 106, an address portion 108 in which address information is stored, and a burst portion 110 in which position information is stored. A burst pattern (position information) that is formed by arranging each burst signal group 110A (110B, 110C, or 110D) at a plurality of positions in a radial direction is formed in the burst portion 110. User data is to be stored in data tracks 112 as shown in the figure.

Figure 3:
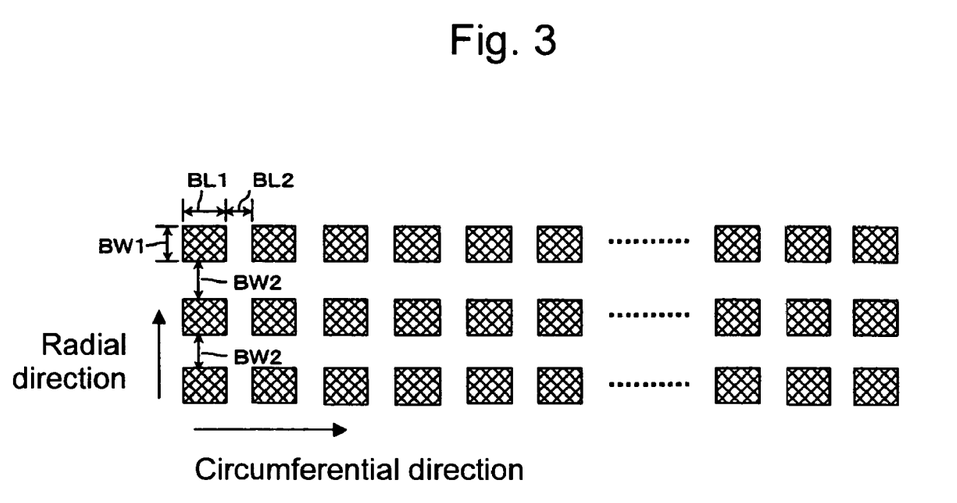
FIG. 3 is an enlarged view schematically showing a part of a burst pattern in the servo region on the magnetic recording medium of the magnetic recording and reproducing apparatus.

FIG. 3 is a view showing a part of the burst pattern (one type of burst signal group in this exemplary embodiment) formed in the servo region 4 of the magnetic recording medium 2, and corresponds to FIG. 20 described above.

Figure 4:
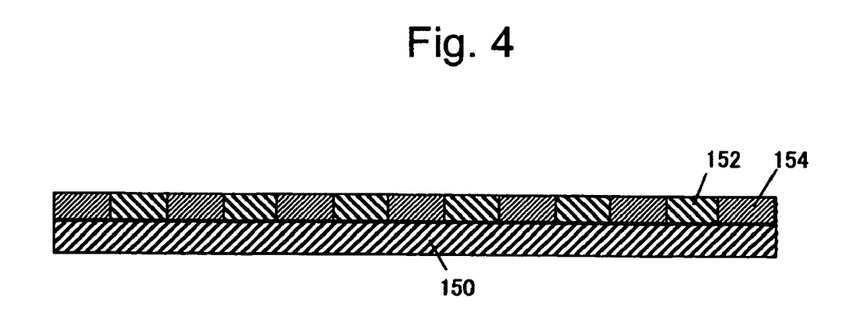
FIG. 4 is a cross-sectional side view schematically showing an exemplary magnetic recording medium of the magnetic recording and reproducing apparatus.

A structure of a concavo-convex pattern in the burst pattern of the magnetic recording medium 2 and arrangement of burst signal groups are the same as those of the aforementioned conventional magnetic recording medium 100. For the conventional magnetic recording medium 100 however, the concavo-convex ratio BL2/BL1 between the length BL2 of the concave portion in the circumferential direction and the length BL1 of the convex portion in the circumferential direction on an identical burst signal group is 1. In contrast to this fact, the concavo-convex ratio BL2/BL1 on an identical burst signal group for the magnetic recording medium 2 is formed to be in a range of larger than 0.19 and smaller than 1. The concavo-convex pattern can be formed by providing convex portions 152 formed by a magnetic layer on a substrate 150 that is formed by a glass substrate, an underlayer, a soft magnetic layer, a seed layer, and the like, as shown in FIG. 4. Concave portions 154 may be filled with a filling material formed of $SiO_2$ and the like.

On the other hand, a plurality of recording tracks arranged in an approximately concentric pattern are formed in the user data region 6. The recording track is formed by convex portions of a concavo-convex pattern. The recording tracks are magnetically separated from each other by a plurality of grooves concentrically formed by concave portions of the concavo-convex pattern. User data is stored as magnetization information in the user data region 6.

Figure 5:
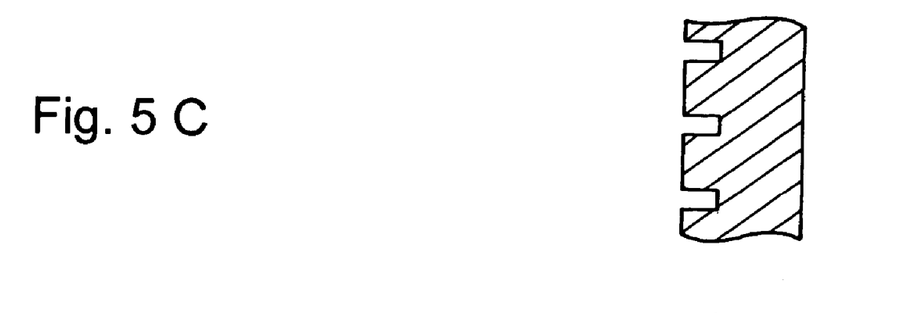
FIGS. 5A, 5B and 5C show a typical method to form a concavo-convex pattern of a magnetic recording medium in the magnetic recording and reproducing apparatus.

The concavo-convex pattern of this magnetic recording medium 2 is formed (recorded) on the magnetic recording medium 2 following the procedure described below using a stamper 30 for manufacturing of a magnetic recording medium as shown in FIG. 5A. Incidentally, a concavo-convex pattern complementary to that of the magnetic recording medium 2 is formed in advance on the stamper 30 for manufacturing of a magnetic recording medium. The convex portions of the stamper 30 for manufacturing of a magnetic recording medium are arranged to correspond to the concave portions of the magnetic recording medium 2 and the concave portions of the stamper 30 for manufacturing of a magnetic recording medium are arranged to correspond to the convex portions of the magnetic recording medium 2.

At first, a starting body of an object to be processed 32 is prepared, as shown in FIG. 5A. As an example, the starting body of the object to be processed 32 can be acquired by depositing an underlayer, a soft magnetic layer, a seed layer, a continuous recording layer, and a mask layer over a glass substrate by sputtering in this order to form a plate shaped body 32A and then using a spin coating method to further coat a resist layer 32B onto the plate shaped body 32A.

Next, as shown in FIG. 5B, using the stamper 30 for manufacturing of a magnetic recording medium, the concavo-convex pattern is formed on the resist layer 32B of the starting body of the object to be processed 32 by, for example, a nano-imprinting technique. The resist layer 32B of the bottom portion of the concave portion is removed and then the mask layer and the continuous recording layer of the plate shaped body 32A are removed by etching, for example, to create the concavo-convex pattern on the plate shaped body 32A as shown in FIG. 5C. Incidentally, the concave portions of the concavo-convex pattern may be filled with a filler material of, for example, $SiO_2$.

The burst pattern on the magnetic recording medium 2 is reproduced by means of the magnetic recording and reproducing apparatus as described below.

Figure 6:
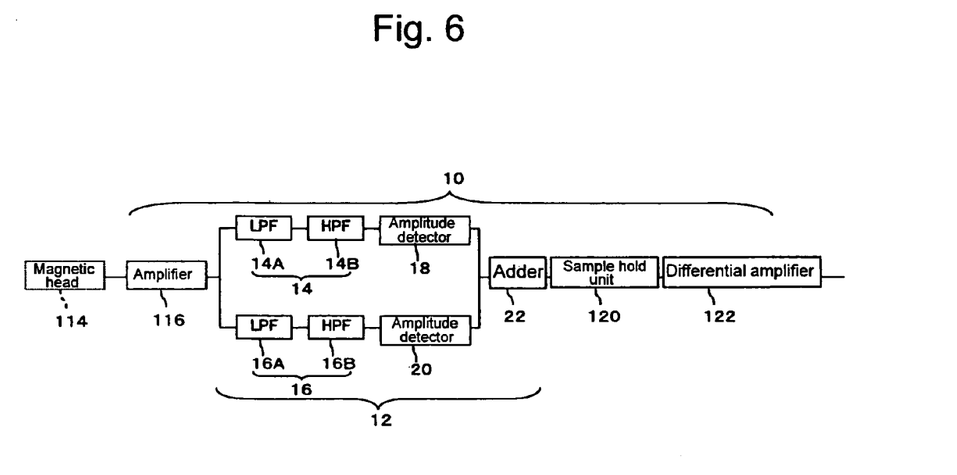
FIG. 6 is a block diagram of a position control circuit of the magnetic recording and reproducing apparatus.

FIG. 6 is a block diagram of a position control circuit 10 of the magnetic recording and reproducing apparatus (not shown) of the first exemplary embodiment, and corresponds to the conventional position control circuit 124 shown in FIG. 21 described above. The structure of the magnetic recording and reproducing apparatus according to the first exemplary embodiment is identical to the above-mentioned conventional magnetic recording and reproducing apparatus except for the magnetic recording medium 2 and the position control circuit 10. Consequently, identical reference numerals in the figures are assigned for identical parts and their descriptions will be omitted (same situation applies to exemplary embodiments below).

The position control circuit 10 that is one of features of this first exemplary embodiment will now be described in detail.

As shown in FIG. 6, the position control circuit 10 is equipped with a signal processing circuit 12 in place of the signal processing circuit 118 in the conventional position control circuit 124.

The signal processing circuit 12 comprises signal extractors (signal extraction devices) 14 and 16 that extract each signal of fundamental wave component and second order harmonic component from reproduced signal of position information recorded on the magnetic recording medium, amplitude detectors (amplitude detection devices) 18 and 20 that detect the amplitude values of the respective signals, and an adder (signal adding device) 22 that adds the amplitude values of the respective signals for generation of position control signals.

The signal extractor 14 is composed of an LPF 14A that removes frequency components at regions higher than the fundamental wave component of the reproduced signal and an HPF 14B that removes frequency components at regions lower than the fundamental wave component of the reproduced signal. Only the signal of the fundamental wave component is extracted from the reproduced signal. On the other hand, the signal extractor 16 is composed of an LPF 16A that removes frequency components at regions higher than the second order harmonic component of the reproduced signal and an HPF 16B that removes frequency components at regions lower than the second order harmonic component of the reproduced signal. Only the signal of the second order harmonic component is extracted from the reproduced signal.

The amplitude detector 18 detects amplitude values of signal of fundamental wave component extracted by the signal extractor 14. On the other hand, the amplitude detector 20 detects the amplitude values of the signal of the second order harmonic component extracted by the signal extractor 16.

The adder 22 adds the amplitude values of the signal of the fundamental wave component and the amplitude values of the signal of the second order harmonic component detected by the respective amplitude detectors 18 and 20. The adder 22 then generates position control signal used for positioning control of the magnetic head 114.

Next, the operation of the magnetic recording and reproducing apparatus according to the first exemplary embodiment will be described.

A reproduced signal of position information read by the magnetic head 114 is amplified by the amplifier 116 and is then input to the signal processing circuit 12. After only the fundamental wave component and the second order harmonic component of the reproduced signal input into the signal processing circuit 12 are extracted, the amplitude value of the signal of the fundamental wave component and the amplitude value of the signal of the second order harmonic component are added and then output to the sample hold unit 120 as position control signal. The sample hold unit 120 holds the position control signal of the burst signal groups 110A, 110B, 110C, and 110D. The differential amplifier 122 obtains an output difference between the position control signals of the burst signal groups 110A and 110B or between the position control signals of the burst signal groups 110C and 110D, thereby acquiring information on the position of the magnetic head 114. In this manner, positioning (tracking) control for the magnetic head 114 is performed.

The magnetic recording and reproducing apparatus according to the first exemplary embodiment has a magnetic recording medium onto which servo information including position information is recorded by a concavo-convex pattern formed by a magnetic layer and signal processing device (the signal processing circuit 12 in the first exemplary embodiment) that generates position control signal of the magnetic head 114 based on amplitude values of the fundamental wave component and at least one harmonic component in the reproduced signal of the position information. Therefore, the output of the position control signal can be made larger and positioning control can be performed with high precision.

Furthermore, the control method of the magnetic recording and reproducing apparatus according to the first exemplary embodiment performs positioning control of the magnetic head 114 based on amplitude values of the fundamental wave component and at least one harmonic component in the reproduced signal of the position information recorded on a magnetic recording medium by a concavo-convex pattern formed by a magnetic layer. It is possible to make the output of the position control signal larger and perform positioning control with high precision.

The signal processing device comprises signal extraction devices (the signal extractors 14 and 16 in the first exemplary embodiment) which extract the fundamental wave component and at least one harmonic component from the reproduced signal of the position information, amplitude detection devices (the amplitude detectors 18 and 20 in the first exemplary embodiment) which detect the amplitude values of the respective signals, and signal adding device (the adder 22 in the first exemplary embodiment) that adds the amplitude values of the respective signals and generates position control signal. Because of this, it is possible to eliminate noise contained in the frequency components except for the fundamental wave component and harmonic component of the reproduced signal to stabilize the position control signal.

Furthermore, because the harmonic component contains a second order harmonic component, the output of the position control signal can be effectively increased.

Even further, because the harmonic component only consists of the second order harmonic component, the effects of noise due to harmonic component can be suppressed and the position control signal stabilized.

The inventors of the present invention used the magnetic recording and reproducing apparatus according to the first exemplary embodiment and measured output values of position control signal. As a comparative example, the output values (amplitude values) of the fundamental wave components (conventional position control signal) of reproduced signals of burst patterns when using a conventional position control circuit were measured.

Table 1 shows these measurement results.

TABLE 1

| Convex length (nm) | Concave length (nm) | Concavo-convex ratio | Exemplary embodiment 1 Fundamental wave amplitude + second harmonic wave amplitude | Comparative example Fundamental wave amplitude |
|---|---|---|---|---|
| 100 | 300 | 3.00 | 0.89 | 0.69 |
| 110 | 290 | 2.64 | 0.91 | 0.75 |
| 125 | 275 | 2.20 | 0.93 | 0.83 |
| 150 | 250 | 1.67 | 0.93 | 0.93 |
| 175 | 225 | 1.29 | 0.98 | 0.98 |
| 200 | 200 | 1.00 | 1.00 | 1.00 |
| 225 | 175 | 0.78 | 1.08 | 0.99 |
| 250 | 150 | 0.60 | 1.15 | 0.96 |
| 275 | 125 | 0.45 | 1.16 | 0.93 |
| 290 | 110 | 0.38 | 1.14 | 0.91 |
| 300 | 100 | 0.33 | 1.11 | 0.92 |
| 325 | 75 | 0.23 | 1.03 | 0.93 |
| 335 | 65 | 0.19 | 1.00 | 0.95 |
| 350 | 50 | 0.14 | 0.99 | 0.95 |

As shown in Table 1, in this experiment a plurality of data were taken for various burst patterns of which the length BL1 of the convex portion in the circumferential direction and the length BL2 of the concave portion in the circumferential direction vary. In Table 1, the value of the length of the convex portion in the circumferential direction and the value of the length of the concave portion in the circumferential direction of the burst patterns each show a value of length in the circumferential direction of the concave portion and a value of length in the circumferential direction of the convex portion of an identical burst signal group at a position with a radius of 20 mm on a 2.5-inch disk. In addition, the width BW1 in the radial direction of the convex portion and the width BW2 in the radial direction of the concave portion of the burst patterns were both 200 nm. Moreover, the track pitch of the data tracks was set to 200 nm (127 kTPI) and the width of the data track was set to 120 nm.

A perpendicular magnetic recording layer having a thickness of 15 nm was formed as the recording layer. This perpendicular magnetic recording layer formed the convex portions of the burst pattern shown in FIG. 3, and was magnetized to generate a magnetic field of a servo signal. More specifically, magnetic poles of an electromagnet that generates a direct-current field of $1.2 \times 10^6$ A/m were arranged in such a manner that a disk surface was parallel to surfaces of the magnetic poles. Then, servo information was recorded by providing magnetization to the perpendicular magnetic recording layer in the servo region in the lump. When the magnetic characteristics of the perpendicular magnetic recording layer were measured by means of a vibrating sample magnetometer (VSM), saturated magnetization Bs was 0.44 T and residual saturated magnetization Br was 0.43 T.

While the magnetic recording medium having the above structure was rotated at 4200 rpm, the magnetic head was flown above a position corresponding to 20 mm in radius on the 2.5-inch disk at a height of 11 nm. In this state, the burst pattern was reproduced by a GMR magnetic head having a reading width of 120 nm and the output of the position control signal was measured for each of the magnetic recording and reproducing apparatus of the first exemplary embodiment and the conventional magnetic recording and reproducing apparatus. In Table 1 shown above, the output value of the fundamental wave component was standardized so as to be 1.00 when the concavo-convex ratio A/B between the length A in the circumferential direction of the concave portion and the length B in the circumferential direction of the convex portion was 1.00.

Figure 7:
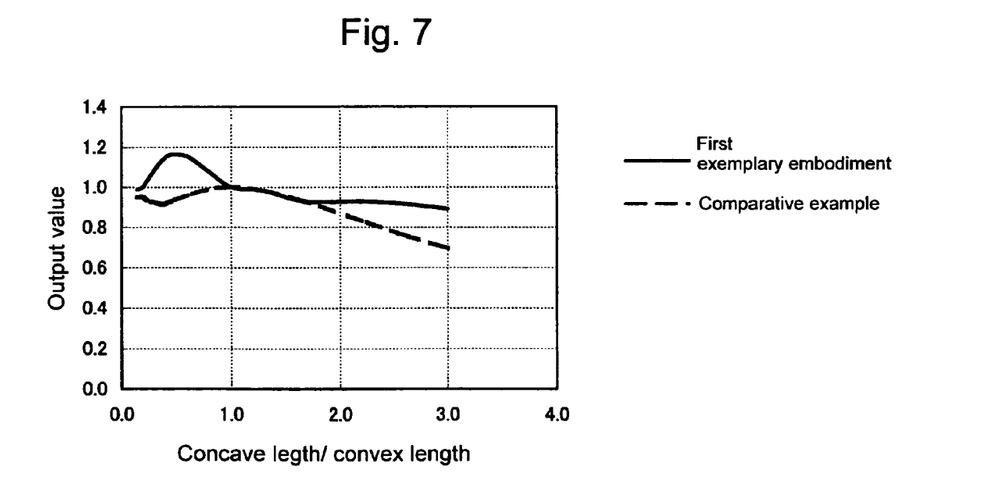
FIG. 7 is a graph showing the relationship between the concavo-convex ratio of the concavo-convex pattern and the standardized output value in the magnetic recording and reproducing apparatus.

FIG. 7 shows a graph of the relationship between the concavo-convex ratio of the burst pattern and the standardized output values based on the measurement results in Table 1. The solid line in the figure indicates the output value of the position control signal of the first exemplary embodiment and the broken line indicates the output value of the position control signal of the comparative example.

As shown in Table 1 and FIG. 7, it was understood that in the magnetic recording and reproducing apparatus according to the first exemplary embodiment, the output values of the position control signals were identical or become larger compared to the comparative example when the concavo-convex ratios were within a range of larger than 0.14 and smaller than 0.19 as well as within a range of larger than 1.00 and smaller than 3.00. Furthermore, it was discovered that the output values of the position control signals could be greatly increased compared to other concavo-convex ratios when the concavo-convex ratios were within a range of larger than 0.19 and smaller than 1.00. In other words, the magnetic recording and reproducing apparatus according to the first exemplary embodiment can increase the output of the position control signal because the concavo-convex ratio BL2/BL1 between the length BL2 in the circumferential direction of the concave portion and the length BL1 in the circumferential direction of the convex portion in the identical burst signal group is within a range of larger than 0.19 and smaller than 1.

The output values of the position control signals had tendency to decrease when the concavo-convex ratios were in a range less than 0.5. This is thought to be due to the fact that third order, or higher, harmonic components become larger.

The inventors of the present invention further measured a position error signal (PES) with respect to the magnetic head position for each of the magnetic recording and reproducing apparatus of the first exemplary embodiment and the conventional magnetic recording and reproducing apparatus.

In the magnetic recording and reproducing apparatus according to the first exemplary embodiment, position error signals were measured when the length in the circumferential direction of the convex portion of the burst pattern was 250 nm and the length in the circumferential direction of the concave portion was 150 nm (concavo-convex ratio of 0.60) (working example 1-1) and when the length in the circumferential direction of the convex portion of the burst pattern was 300 nm and the length in the circumferential direction of the concave portion was 100 nm (concavo-convex ratio of 0.33) (working example 1-2). In contrast, in a conventional magnetic recording and reproducing apparatus, position error signals were measured when the length in the circumferential direction of the convex portion of each of the burst patterns were 200 nm and the length in the circumferential direction of the concave portion was 200 nm (concavo-convex ratio of 1.00).

Figure 8:
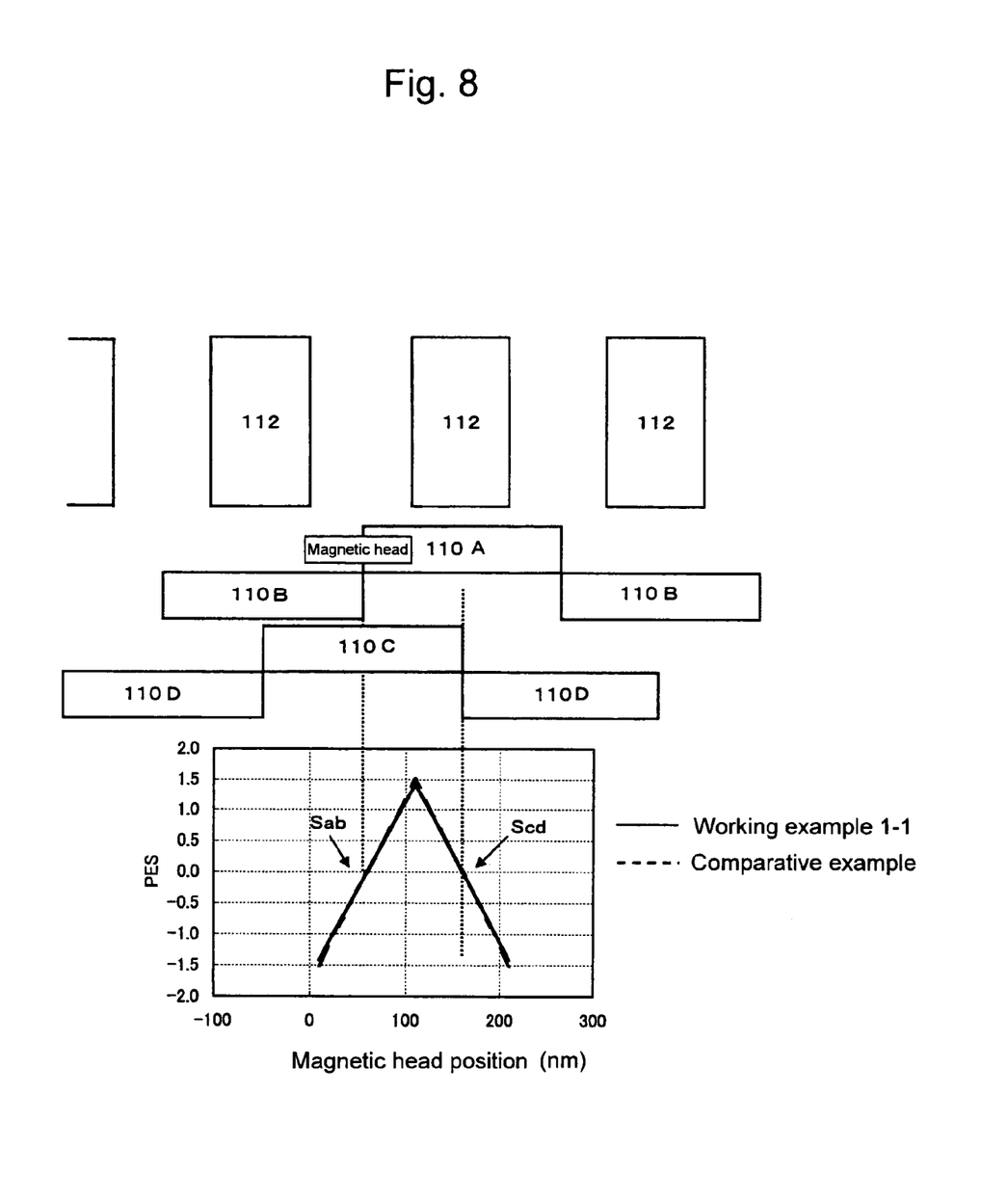
FIG. 8 includes a schematic view showing a positional relationship between data tracks, burst signal groups, and the magnetic head position in the magnetic recording and reproducing apparatus, and a graph showing a relationship between the magnetic head position and a position error signal.

More specifically, as shown in FIG. 8, four burst signal groups 110A, 110B, 110C, and 110D were formed as position information on the magnetic recording medium (one burst signal group was shown with one block in FIG. 8 for convenience). A position error signal Sab obtained from the burst signal groups 110A and 110B and a position error signal Scd obtained from the burst signal groups 110C and 110D both obtained during the movement of the magnetic head were measured. Here, the position error signal Sab is obtained as (Sa−Sb)/(Sa+Sb), where the output of the position control signal of the burst signal group 110A and that of the burst signal group 110B are assumed to be Sa and Sb, respectively. Similarly, the position error signal Scd is obtained as (Sc−Sd)/(Sc+Sd), where the output of the position control signal of the burst signal group 110C and that of the burst signal group 110D are assumed to be Sc and Sd, respectively.

Figure 9:
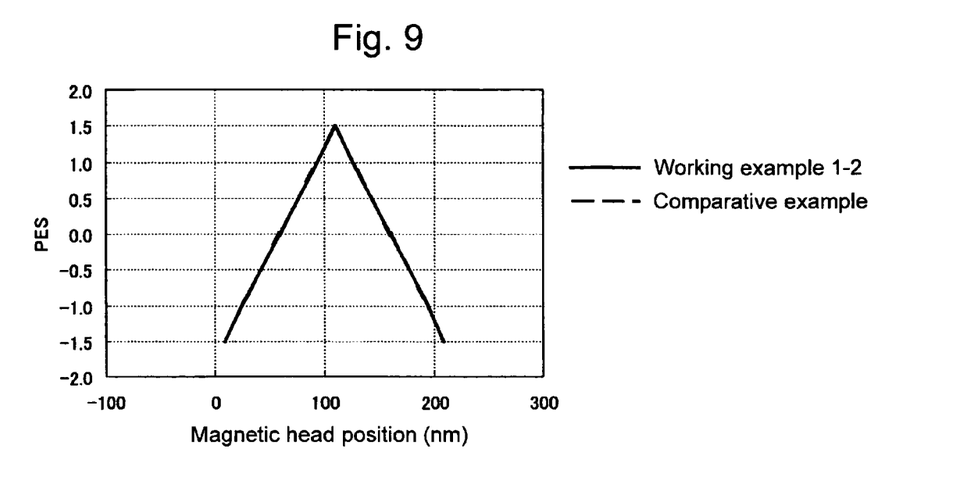
FIG. 9 is a graph showing a relationship between a magnetic head position and an output of the position error signal in the magnetic recording and reproducing apparatus.
Figure 10:
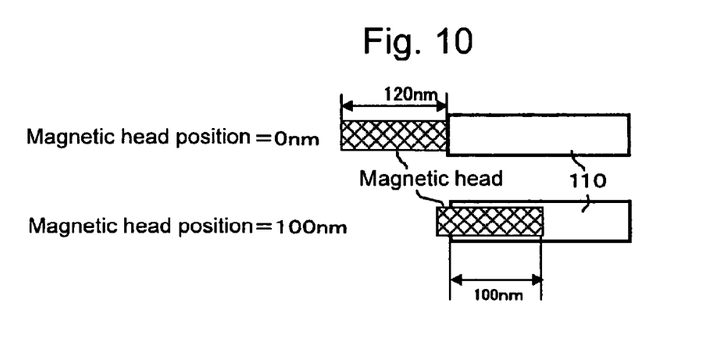
FIG. 10 is a plan view for explaining a definition of the magnetic head position in FIGS. 8 and 9.

The graph in FIG. 8 shows a relationship between the magnetic head position and the position error signal Sab and Scd in the working example 1-1 and the conventional example as a comparative example. And the graph in FIG. 9 shows a relationship between the magnetic head position and the position error signal Sab and Scd in the working example 1-2 and the conventional example as a comparative example. A line sloping upwards (magnetic head position: 10 nm to 110 nm) in FIG. 9 represents the position error signal Sab and a line sloping downwards (magnetic head position: 110 nm to 210 nm) represents the position error signal Scd. As shown in FIG. 10, the position of the magnetic head in the graph shows an interval between the left end of the burst signal group 110A and the right end of the magnetic head.

As shown in FIG. 8 and FIG. 9, it was confirmed that the position error signal of the magnetic recording and reproducing apparatus of the first exemplary embodiment had linearity that was substantially the same as that of the position error signal of the conventional magnetic recording and reproducing apparatus.

As described above, according to the magnetic recording and reproducing apparatus and the control method for the same of the first exemplary embodiment, it is possible to make the output of the position control signal larger and perform positioning control with high precision, while keeping the linearity of the position error signal.

Figure 11:
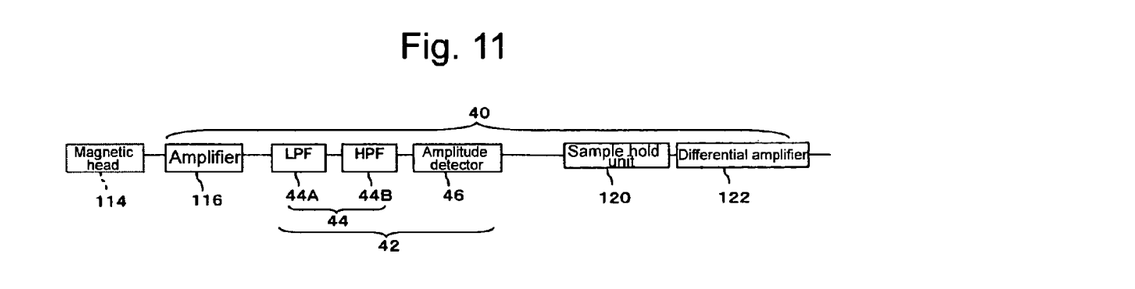
FIG. 11 is a block diagram of a position control circuit in the magnetic recording and reproducing apparatus according to a second exemplary embodiment of the present invention.

FIG. 11 is a block diagram of a position control circuit 40 in the magnetic recording and reproducing apparatus (not shown in the figure) according to a second exemplary embodiment of the present invention.

In place of the signal processing circuit 12 of the first exemplary embodiment, the magnetic recording and reproducing apparatus according to the second exemplary embodiment is equipped with a signal processing circuit 42. The remaining configuration is identical to the first exemplary embodiment.

This signal processing circuit 42 comprises a signal extractor (signal extraction device) 44 that extracts signal which contain fundamental wave component and second order harmonic component from reproduced signal of position information, and an amplitude detector (amplitude detection device) 46 that detects the amplitude values of the signal and generates position control signal.

The signal extractor 44 is composed of a LPF 44A that removes frequency components at regions higher than the second order harmonic component of the reproduced signal and a HPF 44B that removes frequency components at regions lower than the fundamental wave component of the reproduced signal.

The amplitude detector 46 detects amplitude values of signal which contain fundamental wave component and second order harmonic component extracted by the signal extractor 44 and then generates position control signal.

In the magnetic recording and reproducing apparatus according to the second exemplary embodiment, the signal processing device (the signal processing circuit 42 in the second exemplary embodiment) is composed of signal extraction device (the signal extractor 44 in the second exemplary embodiment) that extracts signal which contain fundamental wave component and at least one harmonic component from reproduced signal of position information, and amplitude detection device (the amplitude detector 46 in the second exemplary embodiment) that detects amplitude values of the signal and generates position control signal. Thus, the circuitry can be simplified compared to the magnetic recording and reproducing apparatus according to the first exemplary embodiment. The magnetic recording and reproducing apparatus according to the second exemplary embodiment is suitable when there is only a little noise of reproduced signal of position information.

Figure 12:
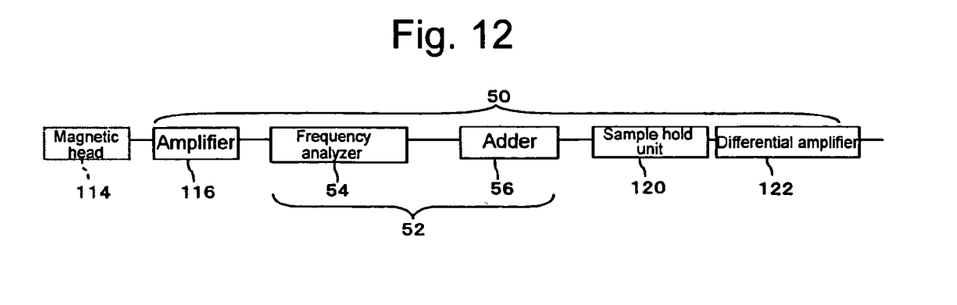
FIG. 12 is a block diagram of a position control circuit in the magnetic recording and reproducing apparatus according to a third exemplary embodiment of the present invention.

FIG. 12 is a block diagram of a position control circuit 50 in the magnetic recording and reproducing apparatus (not shown in the figure) according to a third exemplary embodiment of the present invention.

In place of the signal processing circuit 12 of the first exemplary embodiment, the magnetic recording and reproducing apparatus according to the third exemplary embodiment is equipped with a signal processing circuit 52. The remaining configuration is identical to the first exemplary embodiment.

This signal processing circuit 52 is composed of a frequency analyzer (frequency analyzing device) 54 that analyzes the frequency of the reproduced signal of the position information and then detects the respective amplitude values of the fundamental wave component and second order harmonic component in this reproduced signal, and an adder (signal adding device) 56 that adds the respective amplitude values and generates position control signal.

The frequency analyzer 54 analyzes the frequency of the reproduced signal of the position information and then detects the respective amplitude values of the fundamental wave component and second order harmonic component in the reproduced signal.

The signal adder 56 adds the amplitude values of the fundamental wave component and the amplitude values of the second order harmonic component detected by the frequency analyzer 54 and then generates position control signal.

In the magnetic recording and reproducing apparatus according to the third exemplary embodiment, the signal processing device (the signal processing circuit 52 in the third exemplary embodiment) is composed of frequency analyzing device (the frequency analyzer 54 in the third exemplary embodiment) that analyzes the frequency of the reproduced signal of the position information and then detects respective amplitude values of the fundamental wave component and at least one harmonic component in this reproduced signal, and signal adding device (the signal adder 56 in the third exemplary embodiment) that adds the respective amplitude values and generates position control signal. Thus, noise included in the frequency components other than the fundamental wave component and the harmonic component of the reproduced signal can be reliably eliminated and stabilized position control signal can be achieved.

The magnetic recording and reproducing apparatus and the control method thereof according to the present invention are not limited to those shown in the first to third exemplary embodiments.

Consequently, although position control signal is generated based on amplitude values of fundamental wave component and second order harmonic component in the reproduced signal of position information by the above-mentioned signal processing circuits 12, 42, or 52, for example, position control signal can also be generated based on amplitude values of Nth order harmonic components (N being an integer equal to 3 or more) in addition to amplitude values of fundamental wave component and second order harmonic component or position control signal can be generated based on amplitude values of fundamental wave component and Nth order harmonic component excluding second order harmonic component. In other words, the signal processing device according to the present invention can generate position control signal based on amplitude values of fundamental wave component and at least one harmonic component in the reproduced signal of position information.

The magnetic recording medium is not limited to a perpendicular recording medium. The present invention can be also applied to a longitudinal recording medium. For this case, it is preferable to arrange an integrator between the amplifier 116 and the signal processing circuit 12 (42, 52) in the first to third exemplary embodiments to integrate the reproduced signal waveforms of the position information in the longitudinal recording medium, thereby providing a waveform shape identical to the reproduced signal waveform of the position information in the perpendicular magnetic recording medium.

Figure 13:
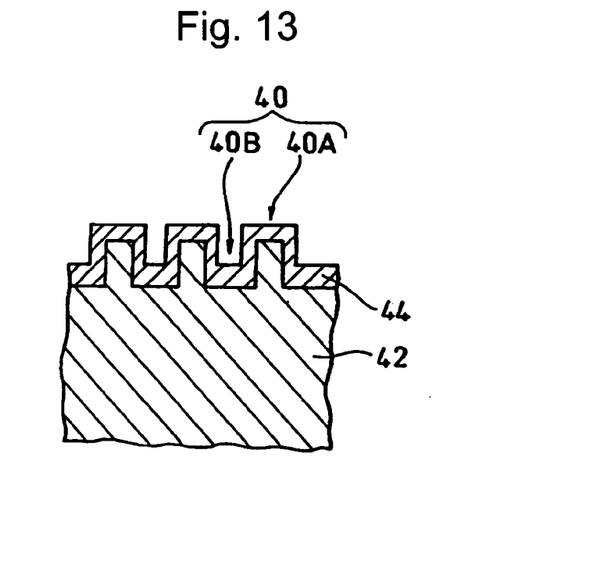
FIG. 13 is a cross-sectional side view schematically showing a second example of the concavo-convex pattern in the servo region on the magnetic recording medium according to the present invention.
Figure 14:
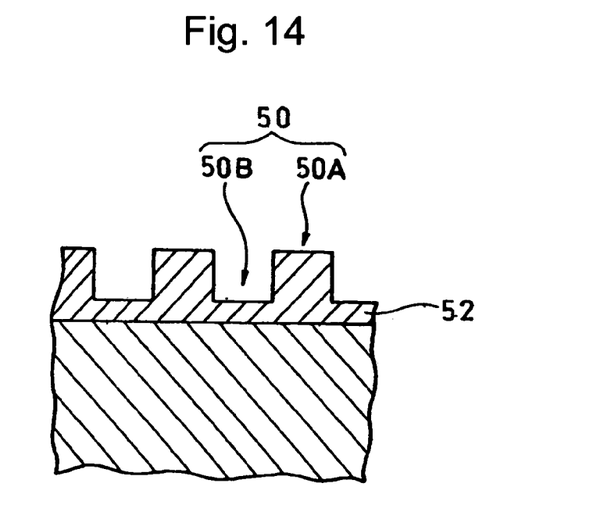
FIG. 14 is a cross-sectional side view schematically showing a third example of the concavo-convex pattern in the servo region on the magnetic recording medium according to the present invention.
Figure 15:
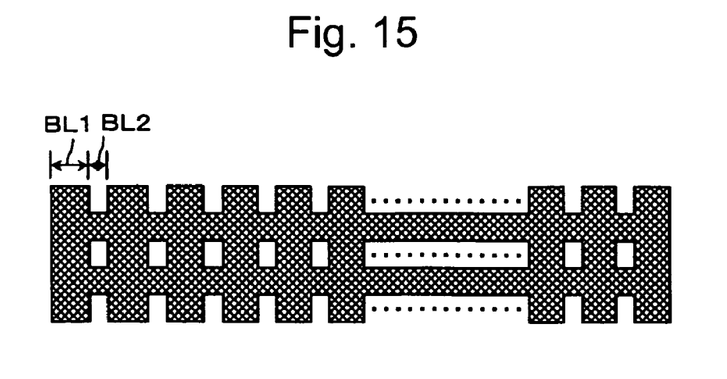
FIG. 15 is a plan view schematically showing a fourth example of the concavo-convex pattern in the servo region on the magnetic recording medium according to the present invention.
Figure 16:
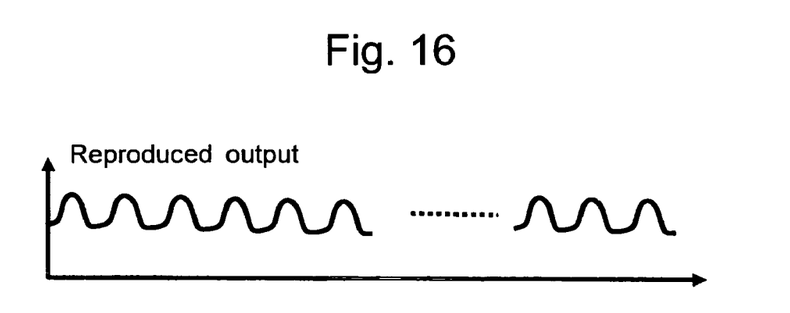
FIG. 16 shows a waveform of the reproduced signal of the concavo-convex pattern in the magnetic recording medium according to the fourth example.

The "concavo-convex pattern" in the present invention is not limited to that described in the first exemplary embodiment. For example, as shown in FIG. 13, a concavo-convex pattern 40 may be formed by forming a magnetic layer 44 to cover a concavo-convex pattern formed on a substrate 42. In the concavo-convex pattern 40, the magnetic layer 44 forms not only convex portions 40A but also bottom of concave portions 40B. Alternatively, as shown in FIG. 14, a magnetic layer 52 may form a concavo-convex pattern 50 including not only convex portions 50A but also bottoms of concave portions 50B. Moreover, the convex portions shown in FIG. 3 (mesh portions in FIG. 3) may be changed into concave portions of the concavo-convex pattern (white portions in FIG. 15). For this case, since the portion that is the concave portion in FIG. 3 is composed of a convex portion formed of a magnetic layer, the base of the output values for the reproduced signal of the concavo-convex pattern entirely rises upward as shown in FIG. 16. However, it is thought that if the concavo-convex ratio BL2/BL1 in an identical burst signal group is the same, the waveform of the reproduced signal itself will not be different from one generated by the concavo-convex pattern of FIG. 3 thereby making it possible to obtain results identical to the first to third exemplary embodiments with the concavo-convex ratio BL2/BL1 in an identical burst signal group being within a range of larger than 0.19 and smaller than 1.

In the first to third exemplary embodiment, application example to a discrete track medium having a user data region in which concentric recording tracks are formed by convex portions formed by a magnetic layer and are magnetically separated from each other by a plurality of concentric grooves (i.e., concave portions of a concavo-convex pattern) are shown. However, the present invention is not limited thereto.

For example, the present invention can be applied to a so-called patterned medium in which convex portions formed by sectioning a magnetic layer in a mesh-like pattern or a dot pattern (i.e., dividing each recording track into a plurality of parts in the circumferential direction in such a manner that those parts are magnetically separated from each other) are isolated from each other like islands. Moreover, the magnetic layer in the user data region may be formed by a continuous magnetic layer in which no concavo-convex pattern is formed.

In the first exemplary embodiment, the burst pattern formed by four burst signal groups 110A, 110B, 110C, and 110D is formed as position information on the magnetic recording medium. However, the present invention is not limited thereto. For example, a burst pattern may be formed to include a pair of burst signal groups 110A and 110B only. In addition, the arrangement of the burst signal groups with respect to the data tracks is not limited specifically. For example, a pair of position information, i.e., the burst signal groups 110A and 110B may be arranged at positions shifted from positions of another pair of position information, i.e., the burst signal groups 110C and 110D by one third of the track pitch.

The present invention can be applied to a magnetic recording and reproducing apparatus equipped with a magnetic recording medium such as a discrete track medium or patterned medium and a control method thereof, a magnetic recording medium, and a stamper for manufacturing of the magnetic recording medium.

What is claimed is:

1. A magnetic recording and reproducing apparatus comprising:
   a magnetic recording medium onto which servo information including position information is recorded by a concavo-convex pattern formed by a magnetic layer; and
   signal processing device that generates a position control signal of a magnetic head based on amplitude values of fundamental wave component and at least one harmonic component in a reproduced signal of the position information,
   wherein the position information comprises burst signal groups wherein a plurality of the concavo-convex patterns are arranged in a circumferential direction; and
   a concavo-convex ratio A/B between a length A in the circumferential direction of a concave portion and a length B in the circumferential direction of the convex portion in the identical burst signal group is within a range of larger than 0.19 and smaller than 1.

2. The magnetic recording and reproducing apparatus according to claim 1, wherein the signal processing device comprises:
   signal extraction device that extracts respective signals of the fundamental wave component and the at least one harmonic component from the reproduced signal of the position information;
   amplitude detection device that detects the amplitude values of the respective signals; and
   signal adding device that adds the amplitude values of the respective signals and generates the position control signal.

3. The magnetic recording and reproducing apparatus according to claim 1, wherein the signal processing device comprises:
   signal extraction device that extracts a signal which contains the fundamental wave component and the at least one harmonic component from the reproduced signal of the position information; and
   amplitude detection device that detects an amplitude value of the signal and generates the position control signal.

4. The magnetic recording and reproducing apparatus according to claim 1, wherein the signal processing device comprises:
   frequency analyzing device that analyzes frequency of the reproduced signal of the position information and then detects respective amplitude values of the fundamental wave component and the at least one harmonic component in the reproduced signal; and signal adding device that adds the respective amplitude values and generates the position control signal.

5. The magnetic recording and reproducing apparatus according to claim 1, wherein the harmonic component includes a second order harmonic component.

6. The magnetic recording and reproducing apparatus according to claim 2, wherein the harmonic component includes a second order harmonic component.

7. The magnetic recording and reproducing apparatus according to claim 3, wherein the harmonic component includes a second order harmonic component.

8. The magnetic recording and reproducing apparatus according to claim 4, wherein the harmonic component includes a second order harmonic component.

9. The magnetic recording and reproducing apparatus according to claim 5, wherein the harmonic component consists of only a second order harmonic component.

10. A control method of a magnetic recording and reproducing apparatus comprising performing position control of a magnetic head based on amplitude values of fundamental wave component and at least one harmonic component in a reproduced signal of position information recorded on a magnetic recording medium by a concavo-convex pattern formed by a magnetic layer, wherein the position information comprises burst signal groups wherein a plurality of the concavo-convex patterns are arranged in a circumferential direction; and a concavo-convex ratio A/B between a length A in the circumferential direction of a concave portion and a length B in the circumferential direction of the convex portion in the identical burst signal group is within a range of larger than 0.19 and smaller than 1.

11. The control method of a magnetic recording and reproducing apparatus according to claim 10, wherein the harmonic component includes a second order harmonic component.

12. The control method of a magnetic recording and reproducing apparatus according to claim 10, wherein the harmonic component consists of only a second order harmonic component.

13. The control method of a magnetic recording and reproducing apparatus according to claim 11, wherein the harmonic component consists of only a second order harmonic component.

14. A magnetic recording medium on which position information is recorded, the position information comprising burst signal groups wherein each burst signal group includes a plurality of concave portions and a plurality of convex portions arranged in a circumferential direction, and wherein a concavo-convex ratio A/B between a length A of the concave portion in the circumferential direction and a length B of the convex portion in the circumferential direction on identical burst signal groups is within a range of larger than 0.19 and smaller than 1.

15. A stamper on which a concavo-convex pattern is formed, the concavo-convex pattern corresponds to a concavo-convex pattern on a magnetic recording medium on which position information is recorded, the position information comprising burst signal groups wherein each burst signal group includes a plurality of concave portions and a plurality of convex portions arranged in a circumferential direction, and wherein a concavo-convex ratio A/B between a length A of the concave portion in the circumferential direction and a length B of the convex portion in the circumferential direction on identical burst signal groups is within a range of larger than 0.19 and smaller than 1.

* * * * *